J. H. COVEL.
CORN HEADER.
APPLICATION FILED NOV. 2, 1916.
1,256,776.
Patented Feb. 19, 1918.
3 SHEETS—SHEET 1.
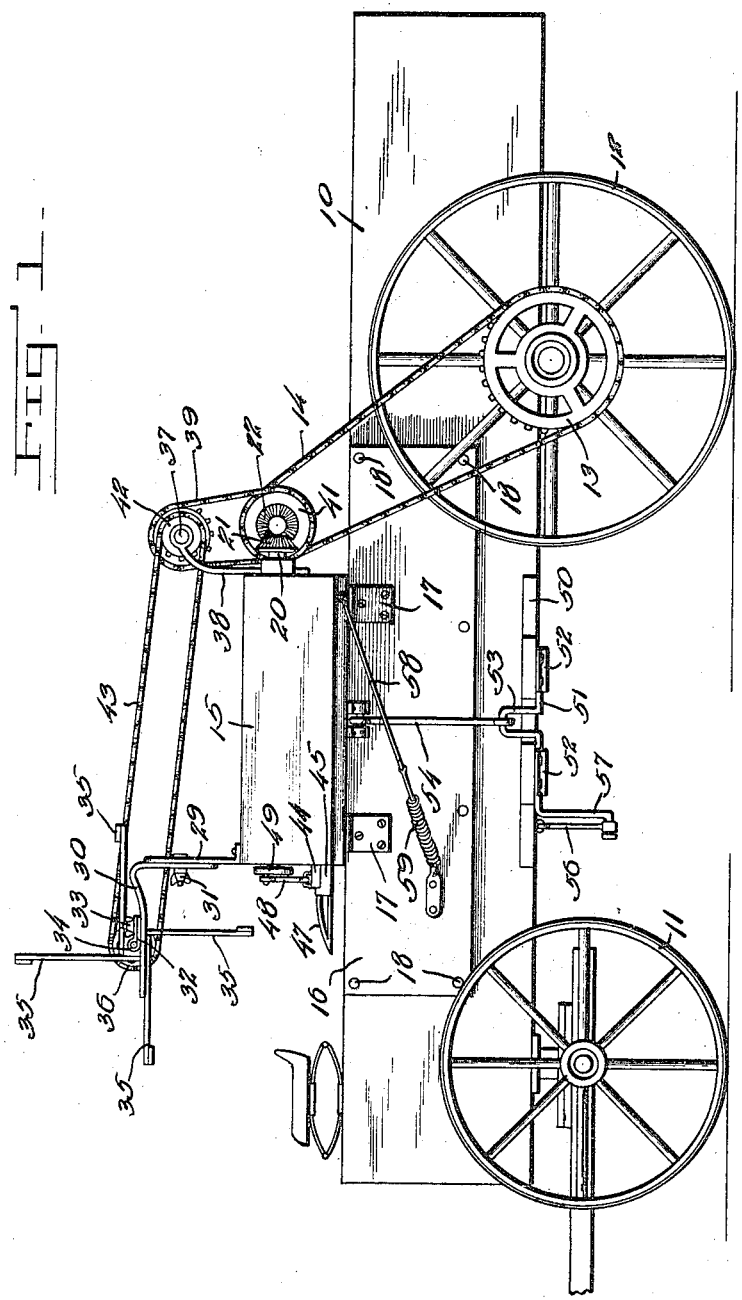
INVENTOR
John H. Covel
ATTORNEY

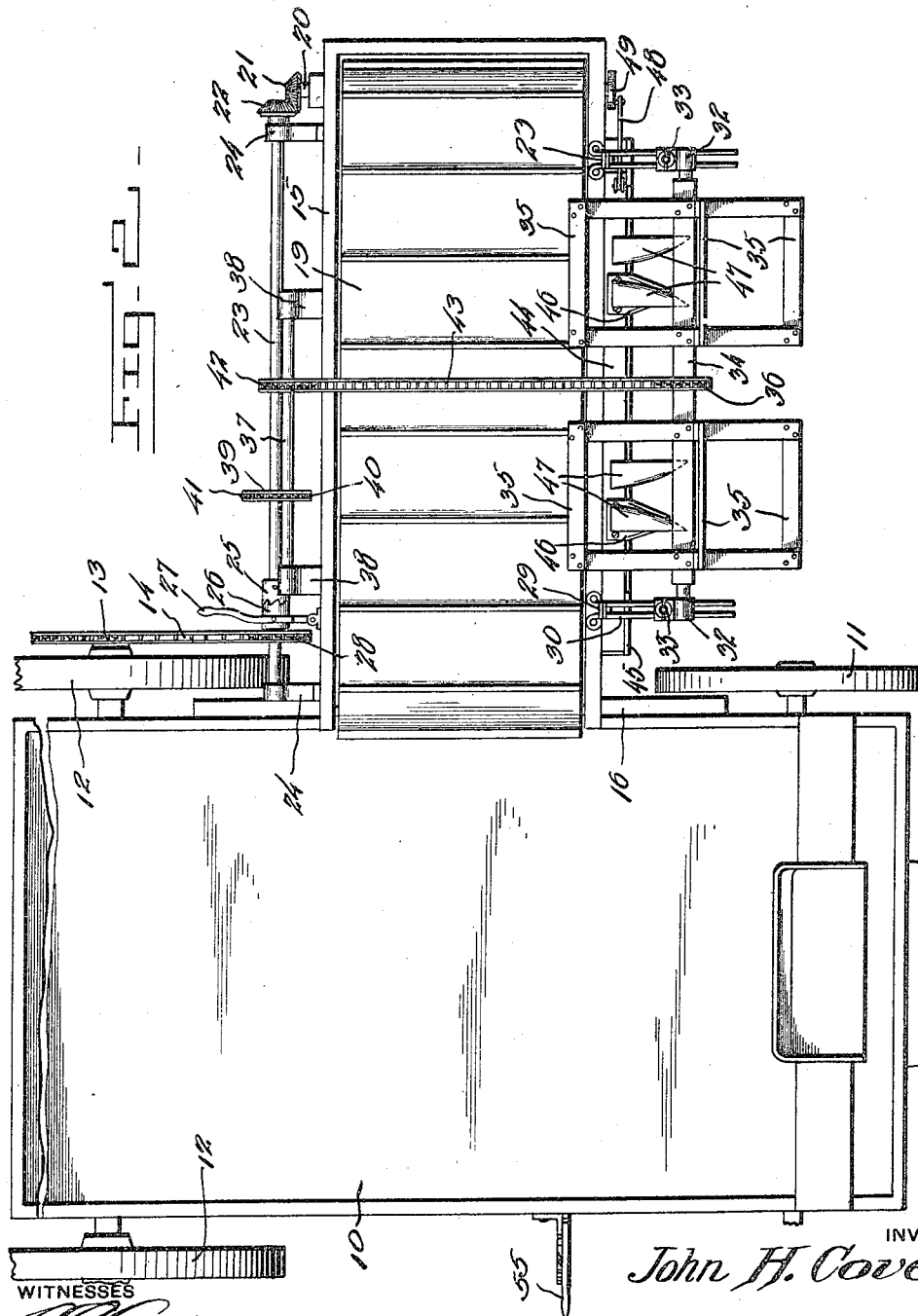

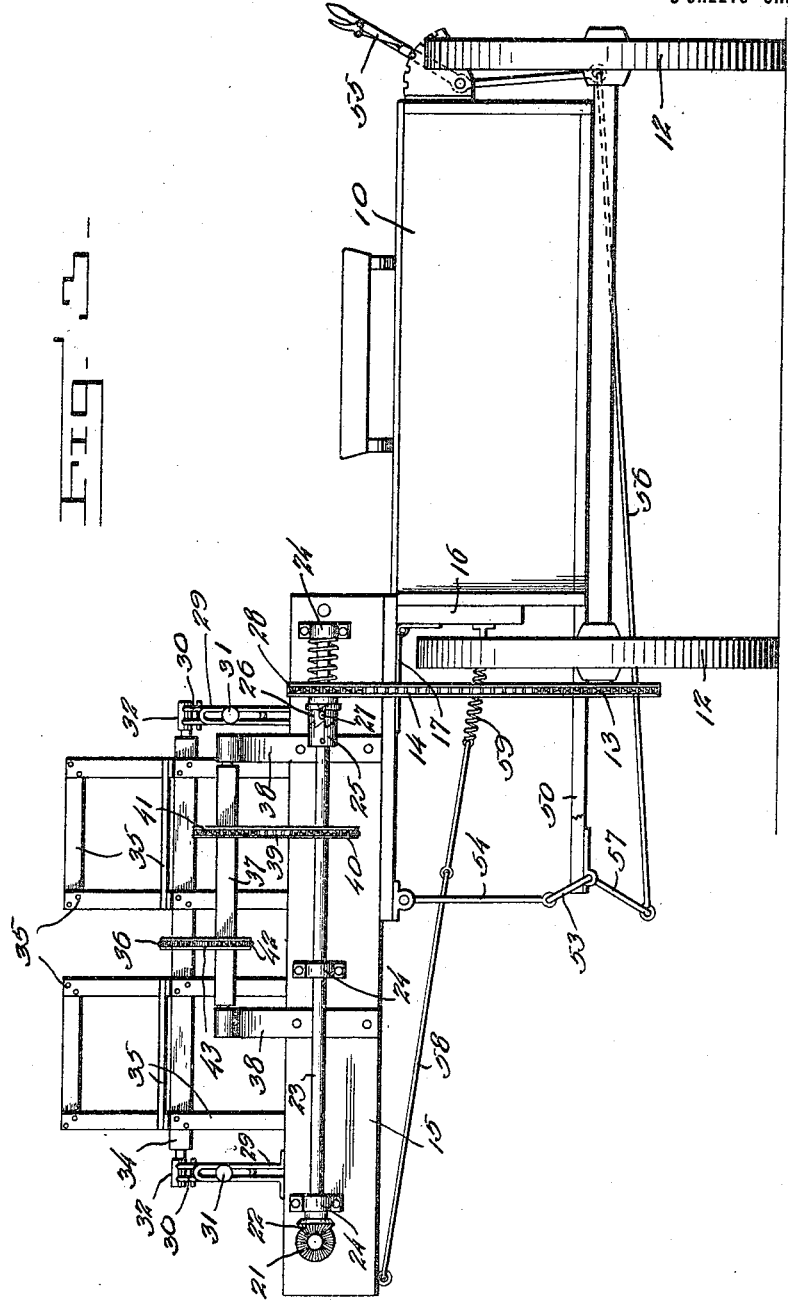

UNITED STATES PATENT OFFICE.

JOHN HENRY COVEL, OF KENEFIC, OKLAHOMA.

CORN-HEADER.

1,256,776.

Specification of Letters Patent.     Patented Feb. 19, 1918.

Application filed November 2, 1916. Serial No. 129,203.

*To all whom it may concern:*

Be it known that I, JOHN H. COVEL, a citizen of the United States, residing at Kenefic, in the county of Bryan and State of Oklahoma, have invented certain new and useful Improvements in Corn-Headers, of which the following is a specification.

This invention relates to an improved machine for heading corn of the type known as Kafir corn and the principal object of the invention is to provide an improved header so constructed that the conveyer box forming part of the header may be adjustably connected with the wagon body and to further so construct this header that the cutting mechanism and feeders may be connected with the conveyer box.

Another object of the invention is to so construct this header that it may be connected with one side of the wagon body between the supporting wheels and extended outwardly and firmly held at a desired angle so that the corn may be cut at the desired height from the ground, the corn being moved into engagement with the cutting knives by the feeders and the cut heads thrown into the conveyer box by the feeders.

Another object of the invention is to provide improved means for releasably holding the conveyer box at the adjusted angle and to further so construct this machine that the driving shaft thereof may be rotated from one of the supporting wheels of the wagon body.

Another object of the invention is to so construct this machine that it will be simple in construction and at the same time strong and durable and to further so construct it that it may be rendered inoperative when so desired.

Another object of the invention is to so construct this machine that when desired it may be removed from the wagon body thus permitting the wagon to be used as an ordinary farm wagon.

This invention is illustrated in the accompanying drawings, wherein:—

Figure 1 is a view showing the improved corn header in side elevation,

Fig. 2 is a top plan view of the improved corn header.

Fig. 3 is a view showing the corn header and wagon in rear elevation.

The wagon body 10 is provided with forward and rear supporting wheels 11 and 12, one of the rear supporting wheels carrying a sprocket wheel 13 about which passes a sprocket chain 14 so that power can be transmitted from the rear supporting wheels to the driving shaft of the corn cutter connected with the wagon body. It will thus be seen that it is not necessary to provide additional driving means for the corn cutter.

The conveyer box 15 is connected with the side boards 16 by means of hinges 17, the side boards being secured to the wagon body by fasteners 18 and so located that the conveyer box or frame will extend from the side of the wagon body between the supporting wheels thereof. A conveyer apron 19 is positioned in this conveyer frame and extends about the usual rollers, the outer one of which is provided with a shaft or axle 20 having a beveled gear 21 at one end meshing with the bevel gear 22 of the driving shaft 23. This driving shaft 23 is mounted in bearings 24 and carries a stationary clutch 25 and a movable clutch 26 which is loosely mounted upon the driving shaft and provided with an actuating lever 27 by means of which it may be moved into and out of engagement with the stationary clutch 25. This movable clutch 26 carries a sprocket wheel 28 about which passes the sprocket chain 14 and it will thus be seen that when the clutch 26 is in engagement with the clutch 25, the driving shaft will be rotated from the supporting wheel 12 and of course the conveyer apron will be moved longitudinally in the conveyer frame or box.

Upon the opposite side of the conveyer frame there has been provided standards 29 which carry brackets 30 releasably held at an adjusted height by means of the fasteners 31 and provided with spaced fingers extending outwardly as shown in Figs. 1 and 2. Bearings 32 are adjustably held in engagement with these brackets 30 by means of fasteners 33 and rotatably support the beater shaft 34 from which extend the beater arms 35 positioned upon opposite sides of the sprocket wheel 36. A driven shaft 37 is rotatably mounted in the bearings 38 upon opposite side of the conveyer frame from the beater shaft and is rotated by means of a sprocket chain 39 passing around the sprocket wheels 40 and 41. This driven sprocket shaft 37 carries a sprocket wheel 42 and a sprocket chain 43 passes about the sprocket wheels 36 and 42 so that when the driving shaft is rotating rotary motion will be transmitted to the driven shaft and from the driven shaft rotary motion will be transmitted to the beater shaft and thus the beaters rotated to bring the Kafir corn into engagement with the cutting means and to throw the cut heads into the conveyer box or frame. The cutter bar or sickle bar 44 is slidably mounted upon the finger bar 45 and carries cutting knives 46 which move in operative relation to the guiding fingers 47. A pitman 48 is connected with this sickle bar 44 and is connected with the eccentric disk 49 carried by the shaft or axle 20 of the outer conveyer roller and therefore when the machine is in operation, the sickle bar will be reciprocated and the cutting knives will cut the corn which passes between the guiding fingers.

When this machine is in use, the conveyer frame will be connected with the wagon body by means of the fasteners 18 passing through the side boards 16 and the platform 50 will be secured beneath the wagon body in any suitable manner. A rocker shaft 51 is mounted in bearings 52 and is provided with a crank arm 53 with which is connected the links 54 leading from the conveyer frame. It will thus be seen that when the latch lever 55 is moved to an adjusted position, the draw bar 56 which leads from the lower end of the latch lever to the lever 57 of the rocker bar will rotate the rocker shaft and will raise or lower the supporting links 54 and thus adjust the angle or incline of the conveyer frame. A bracing rod 58 is connected with the outer end portion of the conveyer frame and with the side boards 16 and is provided with a spring 59 so that the brace can accommodate itself to the distance between the outer end of the conveyer frame and the side boards and still serve to brace the conveyer frame.

When the device is in place, the wagon is driven to the field in which the Kafir corn is growing and is then drawn along the field with the beaters engaging two rows of Kafir corn and moving the same into engagement with the cutting knives between the guiding fingers 47. These cutting knives will cut the Kafir corn at the proper height from the ground, the conveyer frame having been previously adjusted to the proper position and the cut heads of the corn will be thrown into the conveyer frame by the beaters. These heads will land upon the moving conveyer apron and will be carried upwardly and dropped into the wagon body. After the wagon body has been filled, the clutch 26 will be moved out of engagement with the clutch 25 and the wagon can then be driven to the place of storage and back to the field without the corn harvesting attachment in operation. After the corn has all been harvested, the attachment can be removed by simply removing the side boards and platform and chain 14. It will thus be seen that a very convenient device has been provided for harvesting Kafir corn and further that a device has been provided which can be adjusted according to the height of the corn and which is further so constructed that it can be driven from one of the rear supporting wheels of the wagon thus making it unnecessary to provide any additional driving means.

What is claimed is:—

A corn harvesting attachment for a farm wagon including a conveyer frame constituting a body portion, means for connecting the body portion of the attachment with the farm wagon, cutting means connected with the conveyer frame, standards carried by the body portion, brackets connected with the standards for vertical adjustment thereon and having arms extending from the sides of the body portion above the cutting means, bearings connected with the brackets for adjustment toward and away from the body portion, a beater shaft carried by said bearings, beaters extending from the beater shaft in operative relation to the cutting means, a driving shaft connected with the body portion, means for transmitting rotary movement from the driving shaft to the beater shaft, and means for transmitting movement from the driving shaft to the conveyer in the body portion.

In testimony whereof I affix my signature in presence of two witnesses.

JOHN HENRY COVEL.

Witnesses:
C. C. WILFONG,
H. CRUEY MADDOX.

Copies of this patent may be obtained for five cents each, by addressing the "Commissioner of Patents, Washington, D. C."